June 4, 1935.    W. J. PEETS ET AL    2,004,055
UNITARY ELECTRIC MOTOR AND POWER TRANSMITTER
Filed Dec. 14, 1933    4 Sheets-Sheet 4
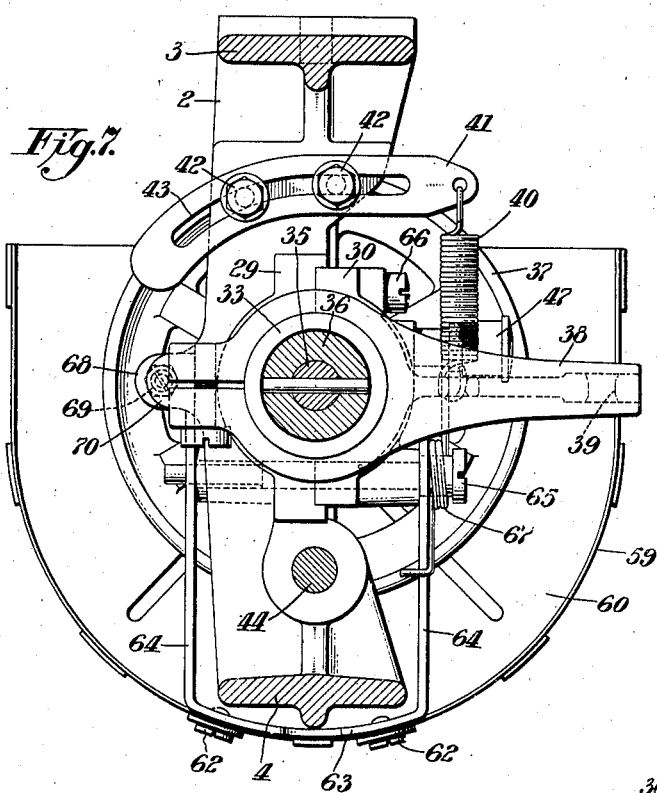
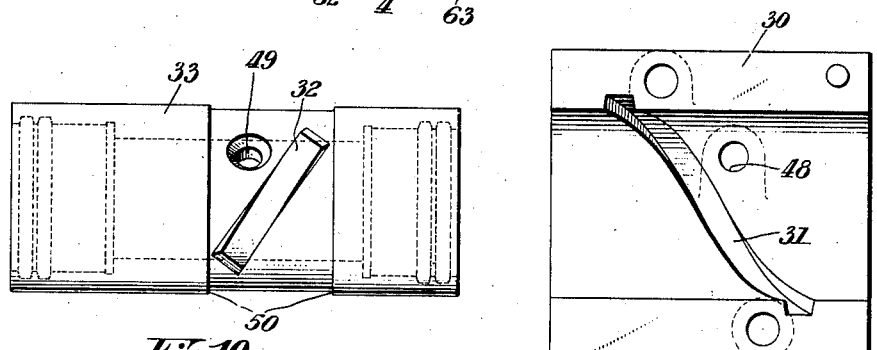
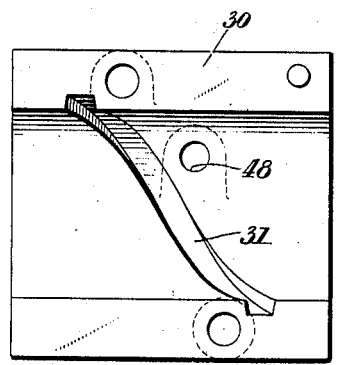
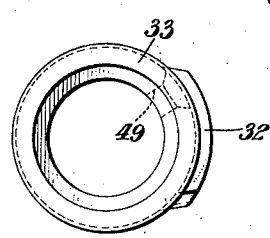
Inventors
Wilbur J. Peets
and Irving F. Webb
Witness:
Godfrey Pring
By Henry J. Miller
Attorney Patented June 4, 1935

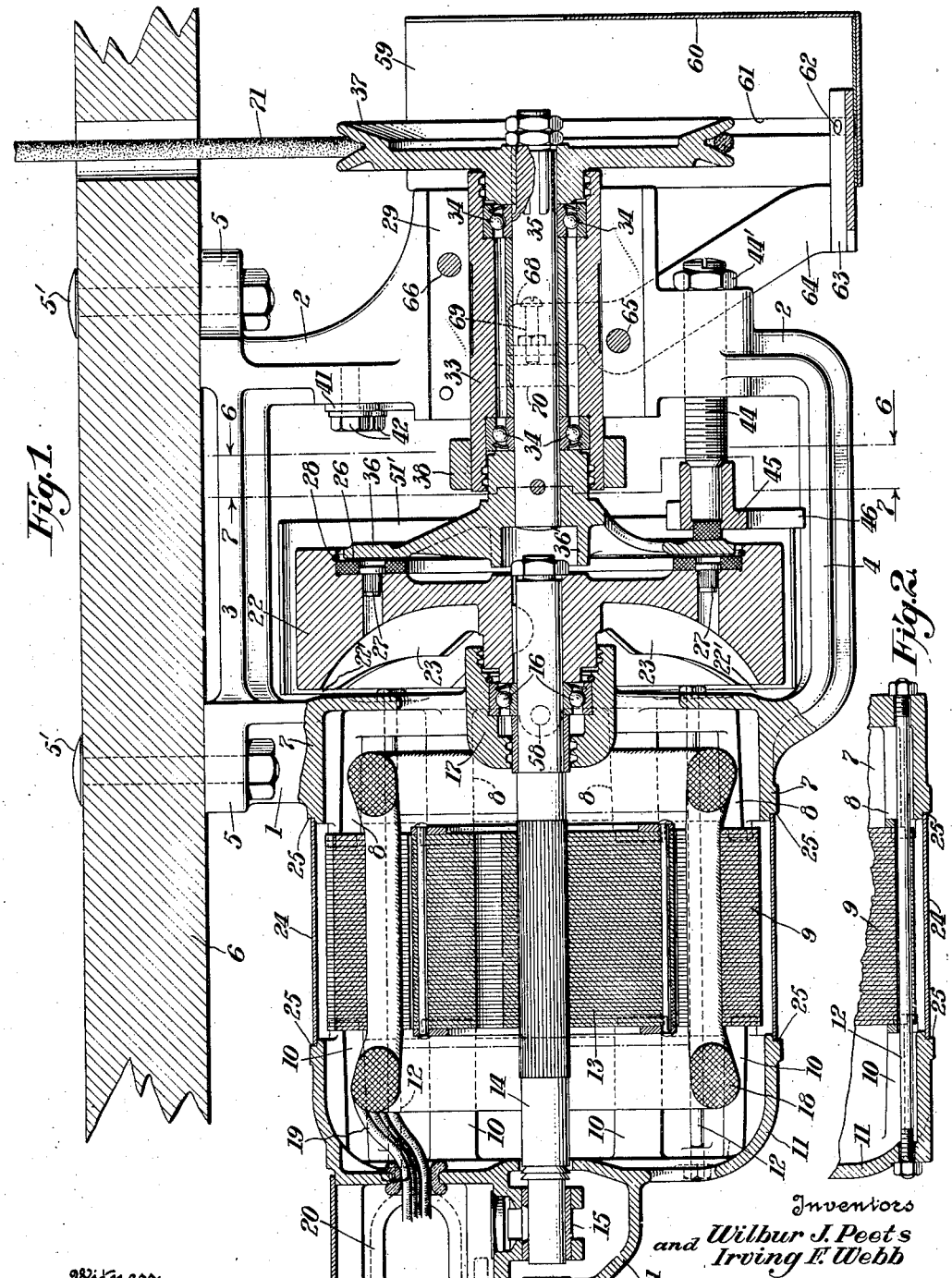

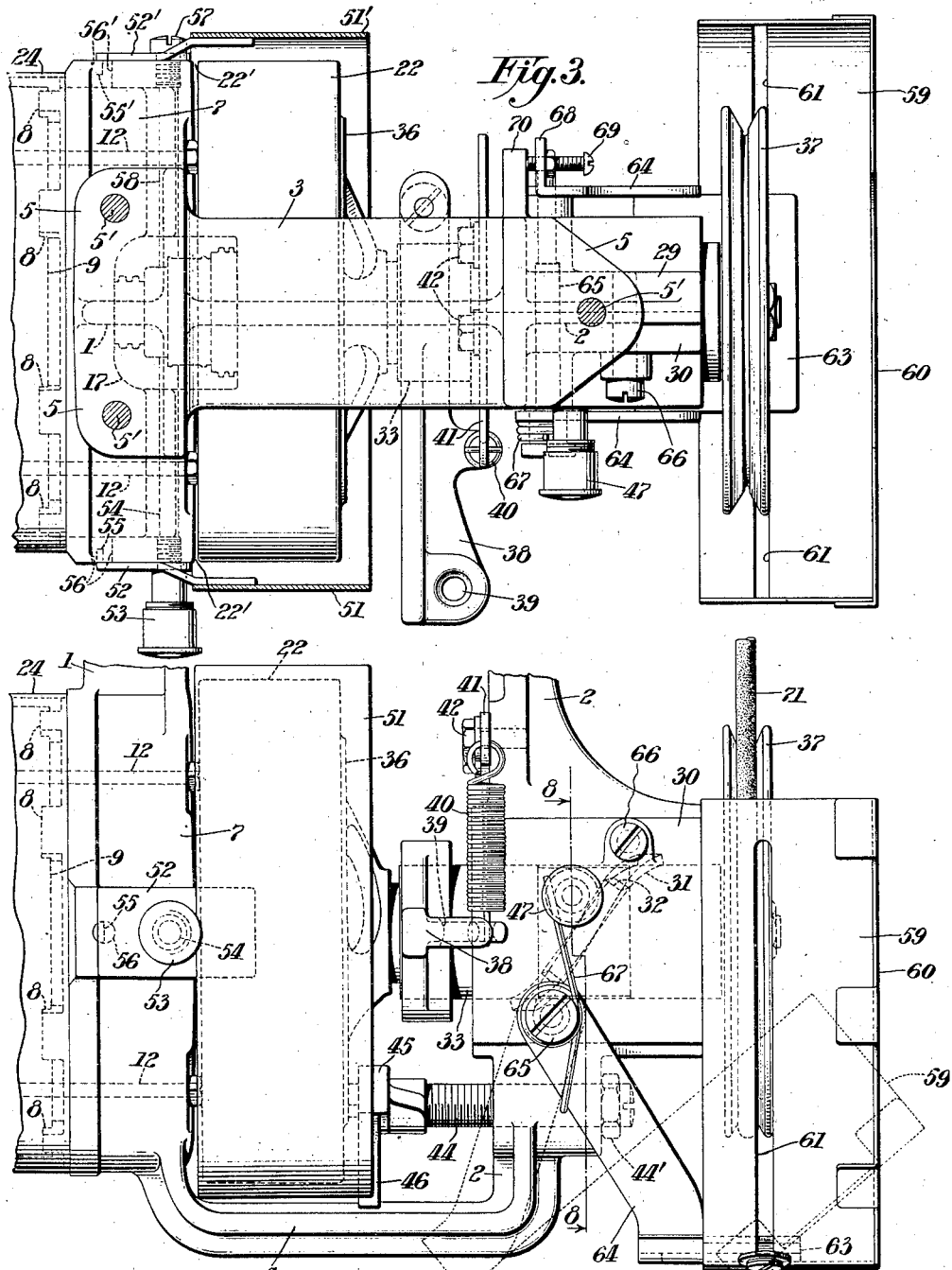

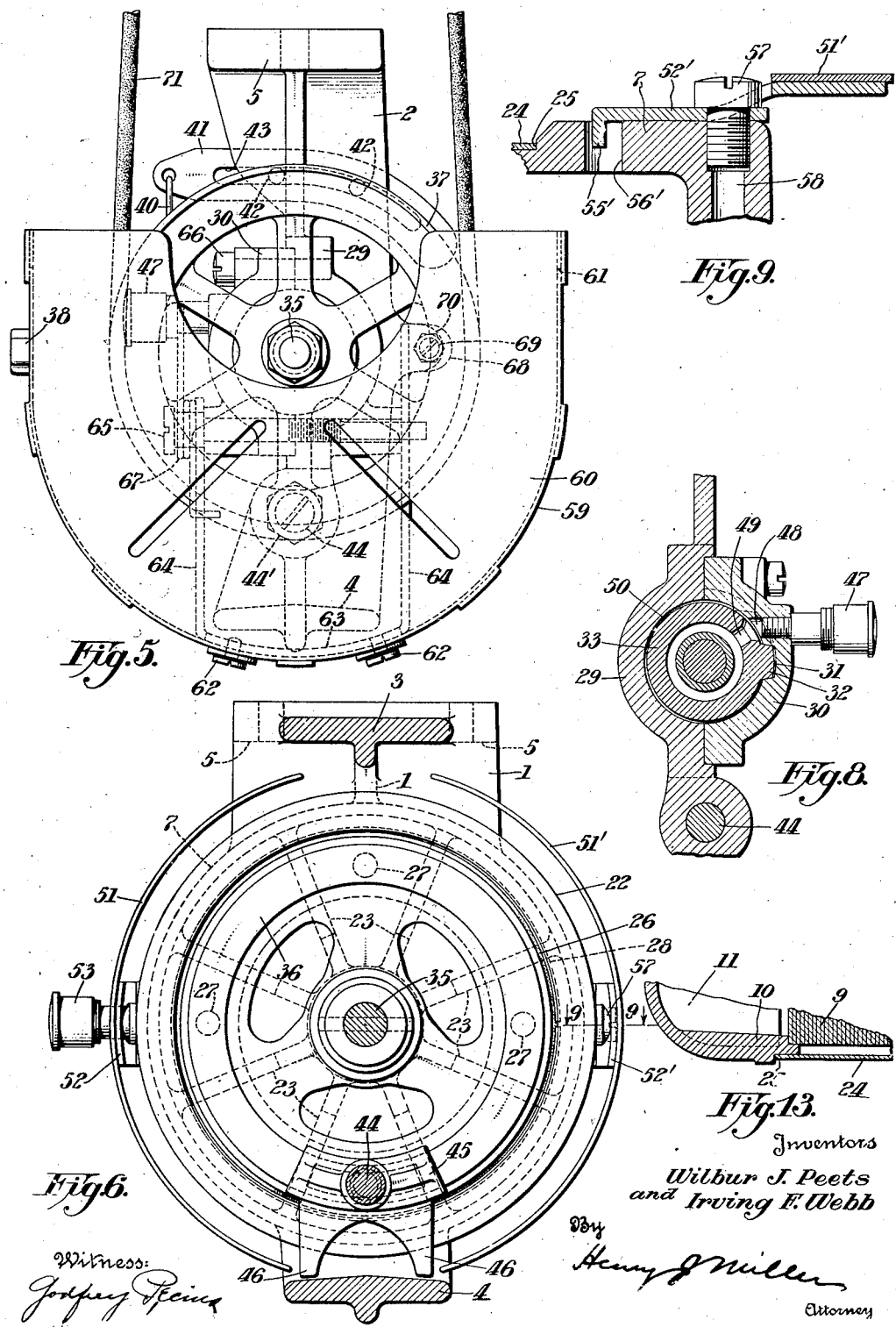

2,004,055

UNITED STATES PATENT OFFICE 2,004,055

UNITARY ELECTRIC MOTOR AND POWER TRANSMITTER

Wilbur J. Peets and Irving F. Webb, Elizabeth, N. J., assignors to The Singer Manufacturing Company, Elizabeth, N. J., a corporation of New Jersey Application December 14, 1933, Serial No. 702,288

14 Claims. (Cl. 192—18)

This invention relates to unitary electric motor and power transmitter devices adapted more particularly for use in garment manufacturing establishments as individual sewing machine drivers; each sewing machine having its own individual motor and transmitter unit.

A sewing machine driver of this type commonly embodies a driving motor to the shaft of which is connected the driving element of a friction clutch; the driven element of such clutch being connected to a manual control mechanism and having a belt-pulley which is connected to the machine to be driven. Such a driver is customarily mounted on the under side of a sewing machine table and a belt is passed upwardly through apertures in the table from the belt-pulley of the driven clutch-element to the sewing machine pulley.

The invention has for an object to improve and simplify the electric transmitter units of the type in question, such as disclosed in the Webb Patent No. 1,510,728, and in the Herr Patent No. 1,514,083, to effect gains in performance and ease of maintenance, together with economies in manufacture.

With the above and other objects in view as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the accompanying drawings, Fig. 1 is a side elevation, partly in longitudinal vertical section, of an electric transmitter unit embodying the invention. Fig. 2 is a fragmentary longitudinal section through the electric motor element showing one of the tie-rods used for clamping the motor field-core between the motor end-bonnets. Fig. 3 is a fragmentary top plan view of the unit. Fig. 4 is a fragmentary side elevation of the unit. Fig. 5 is a pulley-end elevation of the unit. Fig. 6 is a section on the line 6—6, Fig. 1; with the driven-shaft supporting sleeve omitted. Fig. 7 is a section on the line 7—7, Fig. 1. Fig. 8 is a section on the line 8—8, Fig. 4. Fig. 9 is a section on the line 9—9, Fig. 6. Fig. 10 is a side elevation of the driven-shaft supporting sleeve. Fig. 11 is an inside elevation of the removable side bearing cap for the driven-shaft, pulley, and supporting sleeve assembly. Fig. 12 is an end-elevation of the sleeve, and Fig. 13 is a detail sectional view, similar to Fig. 2, but taken at a point to show the seating engagement of the motor field-core with the motor end-bonnets.

The transmitter unit is formed with a one-piece vertically rectangular main supporting frame casting, Fig. 1, including spaced upright side members 1 and 2 connected by top and bottom bars 3 and 4. The frame casting is formed at its upper end with attaching feet 5, Fig. 3, whereby the entire unit may be attached by three bolts 5' to the under side of the sewing machine table 6, without danger of springing or straining the frame.

The side member 1 of the main supporting frame is formed integrally with a cup-shaped portion 7 constituting one end-bonnet of the electric motor and having internal ribs 8 shouldered at their inner ends to form seats for one end of the motor field-core 9, upon the outer or free end of which is similarly seated the ribs 10 of the other end-bonnet 11. Tie-rods 12 between the end-bonnet 11 and cup-shaped portion 7 of the frame member 1 securely clamp the field-core 9 and end-bonnet 11 to the main supporting frame. The rotor 13, which may be of the ordinary squirrel-cage induction type, is carried by the motor shaft 14 journaled at one end in the bearing sleeve 15 and at its other end in the conventional deep-groove ball-bearing 16 in the central bearing housing 17 of the cup-shaped portion 7 of the frame side member 1.

A conventional exciting winding 18 is shown incorporated in the motor field-core 9 and suitable leads 19 from this winding extend into the connection housing 20 above the housing 21 for the bearing 15.

A heavy rimmed fly-wheel 22 is keyed to one end of the motor shaft 14. This fly-wheel is formed in its imperforate inner face or side adjacent the frame end-bonnet 7 with radial fan-vanes 23 which draw cooling currents of air through the motor both internally and externally of the field-core 9 and discharge the air-currents through the relatively narrow air-gap 22' between the rim of the fly-wheel and the adjacent circular portion of the frame side member 1. An external band 24, tightly seated at 25 in the end-bonnets and spaced from the field-core, circumferentially closes the motor-frame.

The fly-wheel has fitted into its circularly recessed outer face, a flat friction ring 26 which is anchored to the fly-wheel by the studs 27 the heads of which are sunk well below the outer or friction face of the ring 26. An expansible spring ring 28 holds the friction ring 26 in its seat in the fly-wheel.

The frame side-member 2 is formed with a split bearing 29 including the removable side bearing cap 30, Fig. 8, formed internally with a helical groove 31 into which fits the helical thread or rib 32 on the sleeve 33 journaled for both turning and endwise movement in the split bearing 29.

Journaled in conventional deep-groove ball-bearings 34 within the sleeve 33 is the stub-shaft 35 to the inner end of which is pinned the hub of the driven friction clutch disk 36 having an inner hub projection 36' of a length such that it will engage the hub of the fly-wheel 22 before the friction face of the ring 26 is worn down sufficiently to expose the heads of the studs 27 to engagement by the driven disk 36. A belt-pulley 37 is splined to the outer end of the stub-shaft 38. The stub-shaft 35 with the driven disk 36 and belt-pulley 37 are thus free to rotate within the sleeve 33 but are confined to move endwise with the latter.

To effect endwise movement of the sleeve 33 there is clamped to the end of the latter within the rectangular frame opening the split hub of a manually controlled clutch-operating arm 38, Fig. 7, having at its free end an eye 39 for attachment of a suitable treadle-rod, not shown. A recovery spring 40 is connected at its lower end to the arm 38 and at its upper end to the anchor arm 41 adjustably bolted by two bolts 42, Fig. 7, to the frame leg 2. The bolts 42 pass through a slot 43 in the arm 41 substantially concentric with the stub-shaft 35. Thus, the operating arm 38 may be adjusted angularly relative to the sleeve shaft 33 and the anchor arm 41 may be correspondingly adjusted. These adjustments are sometimes desirable in case the transmitter is installed in other than a strictly vertical position of the rectangular frame.

There is adjustably mounted in the frame-member 2 a screw-threaded brake-supporting rod 44, Fig. 1, on the inner end of which is swiveled the brake-shoe 45 having arms 46, Fig. 6, which may engage the lower frame bar 4 to prevent the brake-shoe 45 from turning relative to its supporting bar 44. The working clearance between the brake-shoe 45 and the live clutch face 26, for the driven disk 36, may be readily adjusted by turning the rod 44 in the frame member 2; a lock-nut 44' being provided to tighten the rod 44 in adjusted position.

Lubricant may be introduced to the ball bearings 34 from the grease cup 47, Fig. 8, mounted on the bearing cap 30 having a lubricant discharge duct 48 in communication with the duct 49 leading into the space within the sleeve 33. The lubricant will also find its way circularly and externally of the sleeve through the clearance groove 50 to the thread or helical rib 32 which works in the groove 31 within the bearing cap 30.

The clutch-elements 22 and 36 may be surrounded by a pair of similar semi-circular sheet-metal guard-bands 51, 51', each of which is spot-welded centrally of its length to a respective supporting stem 52, 52'. The stem 52 of the guard 51 is secured to the cup-shaped frame side-portion 7 by means of the threaded stem of the grease-cup 53 which is screwed into the outer end of the lubricant duct 54 in the cup-shaped frame side-portion 7 leading into the central bearing housing 17. The guard-stem 52 has an inturned tail 55, Fig. 3, entering a steadying aperture 56 in the frame. Similarly, the other guard-stem 52' is secured to the frame by means of a screw 57 threaded into and closing the outer end of a lubricant duct 58 leading into the central bearing housing 17 from the opposite side of the transmitter unit. The stem 52' has an inturned tail 55' entering the steadying aperture 56' in the frame. The grease cup 53 and screw 57 are interchangeable so that in any installation the grease cup 53 may be located for ready accessibility.

The belt-pulley 37 is embraced by a U-shaped pulley-guard 59 closed at its outer end by a plate 60 and having a slot 61 through which pass screws 62 threaded into the curved bottom portion 63 of a U-shaped bracket the side legs 64 of which are fulcrumed on the bolt 65 which also serves, together with the screw 66 as means for securing the bearing cap 30 to the frame side member 2. A spring 67 yieldingly urges the guard to its full line or pulley-guarding position, Fig. 4, and permits such guard to be swung downwardly to its dotted-line position, exposing the pulley 37. One of the legs 64 of the guard-supporting bracket is extended upwardly at 68, beyond the fulcrum bolt 65, and is fitted with an adjustable stop-screw 69 which impinges upon the frame-ear 70 to limit the upward movement of the guard 59 under the influence of the spring 67. By loosening the screws 62, the guard 59 may be adjusted circularly around the axis of the pulley 37 to meet conditions where the belt 71 may require to be lead upwardly at an inclination to the vertical, or where the transmitter unit may be mounted in other than the vertical position shown.

The provision of a single unitary main-supporting frame-casting for both the motor and transmitter devices simplifies and facilitates machining operations and the securing and maintenance of accuracy of alinement of the rotating parts.

The arrangement of the operating lever 38 within the main rectangular open frame avoids interference with the pulley guard 59. The provision for circular adjustment of the operating arm 38 and its spring anchorage 41, relative to the sleeve 33 and main frame, is a desirable feature where a single main frame casting is used to support both the motor and transmitter devices, as it permits the arm 38 to be positioned substantially horizontally whether the main frame is disposed vertically or at an inclination.

Further, as the clutch facing ring 26 wears, the sleeve 33 may be circularly adjusted relative to the arm 38 to compensate for such wear.

Where a motor of increased power is desired, it is merely necessary to lengthen the motor-field and rotor-cores and use correspondingly longer tie-rods 12, without change of the sizes or shapes of the end-bonnet elements 7, 11.

The weight of the live rotating parts of the motor is supported mainly by the ball-bearing 16, which also serves as a thrust bearing.

The friction ring 26, when worn out, may be readily replaced without the necessity of removing the entire unit from the table 6. By simply removing the readily accessible side bearing cap 30 and backing off the brake-supporting screw 44, the entire coaxial driven shaft 35, driven disk 36, pulley 37 and sleeve 33 assembly may be removed from the main frame, thus exposing the friction ring 26 for removal and replacement. This is a feature of great practical importance.

While I have shown and described in detail one specific embodiment of the invention, it is not to be understood that the invention is limited to the details of construction and relative arrangement of parts herein specifically set forth, as various modifications may obviously be made by one skilled in the art within the spirit and scope of the invention defined in the appended claims.

Having thus set forth the nature of the invention, what we claim herein is:—

1. A unitary electric motor and power transmitter having a pair of cup-shaped motor end-bonnets, a motor shaft and a manually controlled stub-shaft, pulley, and bearing sleeve assembly in end-to-end coaxial relation and having friction clutch elements mounted on their adjacent ends, characterized by this, that one of the cup-shaped motor end-bonnets in which the motor shaft is journaled is constituted by one side member of a vertically rectangular main supporting frame casting having means at its upper end for attachment to the under side of a sewing machine table, the other side member of which frame casting carries the stub-shaft, pulley, and bearing sleeve assembly.

2. The construction set forth in claim 1 in which the frame side member carrying the stub-shaft, pulley, and sleeve assembly, is formed with a split bearing therefor including a removable side bearing cap.

3. A unitary electric motor and power transmitter having a vertically rectangular main supporting frame formed with spaced upright side members and top and bottom connecting bars, said frame having attaching feet at its upper end, one of said side members having a cup-shaped motor end-bonnet portion cast integrally therewith, an electric motor carried and partly constituted by said end-bonnet portion and including a motor shaft, a driven shaft mounted in the other of said upright frame side members for rotary and endwise movement in end-to-end coaxial relation with said motor shaft, friction clutch elements mounted on the adjacent ends of said shafts, a belt-pulley on the driven shaft, and manually controlled means for moving said driven shaft endwise.

4. A unitary electric motor and power transmitter having a main frame, a live clutch element, a motor shaft journaled in said frame and carrying at one end said live clutch element, said frame including a split bearing coaxial with and beyond the end of the motor shaft carrying the live clutch element, a sleeve journaled in and having a helical screw-thread connection with said split bearing, a driven shaft journaled in said sleeve and confined to move endwise with the latter, a driven clutch element fixed to the end of the driven shaft adjacent the live clutch element, a belt pulley on the driven shaft, and a clutch controlling arm on said sleeve.

5. A unitary motor and power transmitter having a frame including attaching feet, a motor including a motor shaft, a driven pulley, a friction clutch connection between said motor shaft and driven pulley, a manually controlled clutch-operating arm, and a recovery spring and spring anchorage therefor, and a U-shaped guard for said belt-pulley, said clutch-operating arm, recovery spring, spring anchorage, and pulley guard being all circularly adjustable relative to said frame about the axis of said belt-pulley.

6. A unitary electric motor and power transmitter having a frame, an electric motor incorporated in said frame and including a motor shaft, a driven shaft mounted for rotary and endwise movement in said frame in end-to-end coaxial relation with said motor shaft, a live clutch element on the motor shaft, a driven clutch element and belt-pulley on the driven shaft, manually controlled means for moving the driven shaft endwise to establish and interrupt driving relation between said clutch elements, an adjustable screw-threaded brake-supporting rod mounted in said frame in parallelism with said driven shaft, a brake-shoe swiveled on one end of said rod in juxtaposition with said driven clutch element, and means for preventing rotation of said brake-shoe on said brake-supporting rod.

7. In a unitary electric motor and power transmitter, a main rectangular supporting frame formed with spaced vertical side members having attaching feet at their upper ends and top and bottom bars connecting said side members, one of said side members being cup-shaped and constituting a motor end-bonnet and the other side member being formed with a split bearing including a removable side bearing cap, a motor field-core and free end-bonnet secured to and carried by said first-mentioned motor end-bonnet, a motor shaft journaled in said end-bonnets, a fly-wheel mounted on said motor shaft within said rectangular frame and having a clutch face, a sleeve journaled in said split bearing for endwise movement, a stub-shaft journaled in said sleeve in alinement with said motor-shaft, a driven clutch element fixed to one end of said stub-shaft adjacent said fly-wheel, a belt-pulley fixed to the opposite end of said stub-shaft, a brake element carried by said rectangular frame, and means including a manually controlled arm for moving said sleeve endwise.

8. A unitary electric motor and power transmitter having a vertically rectangular main supporting frame formed with spaced side members and top and bottom connecting bars, said frame having attaching feet at its upper end, an electric motor carried by one of said side members and including a motor shaft, a driven shaft mounted in the other of said side members for rotary and endwise movement in end-to-end coaxial relation with said motor shaft, friction clutch elements mounted on the adjacent ends of said shafts, a belt-pulley on the driven shaft, manually controlled means for moving said driven shaft endwise, a U-shaped supporting bracket having spaced side legs embracing and fulcrumed at their upper ends to said main supporting frame, and a U-shaped pulley-guard mounted for circular adjustment on the lower member of said U-shaped bracket.

9. A unitary electric motor and power transmitter having a vertically rectangular main supporting frame formed with spaced upright side members and top and bottom connecting bars, one of said side members having a perforate circular cup-shaped portion formed integrally therewith and constituting a motor end-bonnet, a motor field-core and outer perforate end-bonnet bolted to said first-mentioned end-bonnet, a motor shaft journaled in said end-bonnets, a heavy-rimmed imperforate fly-wheel mounted on said motor-shaft within said rectangular main supporting frame and having fan vanes at the side thereof adjacent said first mentioned end-bonnet, there being a relatively narrow air discharge gap between the rim of said fly-wheel and said end-bonnet, said fly-wheel having at its other side a friction clutch face, and a manually controlled driven clutch element, pulley, shaft and supporting sleeve assembly journaled in the other of said main frame side members in end-to-end coaxial relation with said motor-shaft.

10. The construction set forth in claim 1 in which the frame side-member carrying the stub-shaft, pulley, and sleeve assembly, is formed with a split bearing therefor including a removable side bearing cap, and in which there is a screw-thread clutch-operating connection between the sleeve and its split bearing.

11. The construction set forth in claim 1 in which the frame side-member carrying the stub-shaft, pulley, and sleeve assembly, is formed with a split bearing therefor including a removable side bearing cap, and in which there is a screw-thread clutch-operating connection between the sleeve and its split bearing, and in which the sleeve has clamped thereto for relative circular adjustment a clutch-operating arm, there being a recovery spring and an anchorage therefor mounted on the frame for corresponding circular adjustment about the axis of said sleeve.

12. The construction set forth in claim 1 in which the frame side-member carrying the stub-shaft, pulley, and sleeve assembly, is formed with a split bearing therefor including a removable side bearing cap, and with a stationary brake-shoe freely mounted on the inner end of a supporting screw adjustably mounted in the frame side-member carrying the stub-shaft and sleeve assembly.

13. The construction set forth in claim 1 in which the frame side-member carrying the stub-shaft, pulley, and sleeve assembly, is formed with a split bearing therefor including a removable side bearing cap, and in which there is a screw-thread clutch-operating connection between the sleeve and its split bearing, and with a stationary brake-shoe freely mounted on the inner end of a supporting screw adjustably mounted in the frame side-member carrying the stub-shaft and sleeve assembly, and in which the brake-shoe is prevented from rotating with its adjustable supporting screw by a sliding engagement with the lower cross bar of the main frame.

14. The construction set forth in claim 1 in which the frame side-member carrying the stub-shaft, pulley, and sleeve assembly, is formed with a split bearing therefor including a removable side bearing cap, and in which there is a screw-thread clutch-operating connection between the sleeve and its split bearing, and with a pulley-guard mounted for circular adjustment on the lower curved member of a U-shaped bracket, the legs of which bracket straddle and are fulcrumed on the main frame.

WILBUR J. PEETS.
IRVING F. WEBB.